July 11, 1967     H. JACOBSEN     3,330,021
PIPE ALIGNING TOOL
Filed June 15, 1964     6 Sheets-Sheet 1
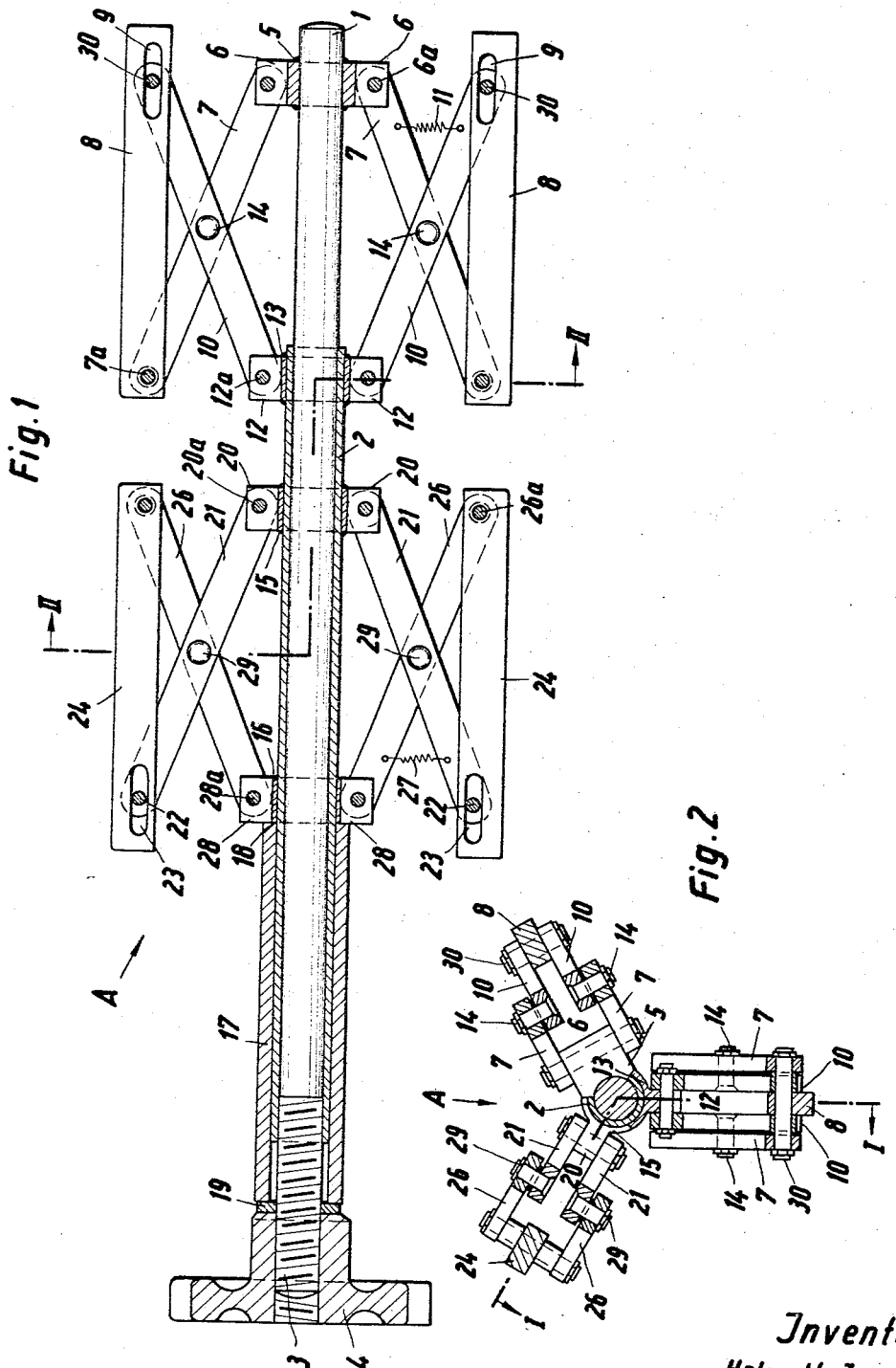
Inventor:
Helmuth Jacobsen
by Michael J. Striker
his attorney

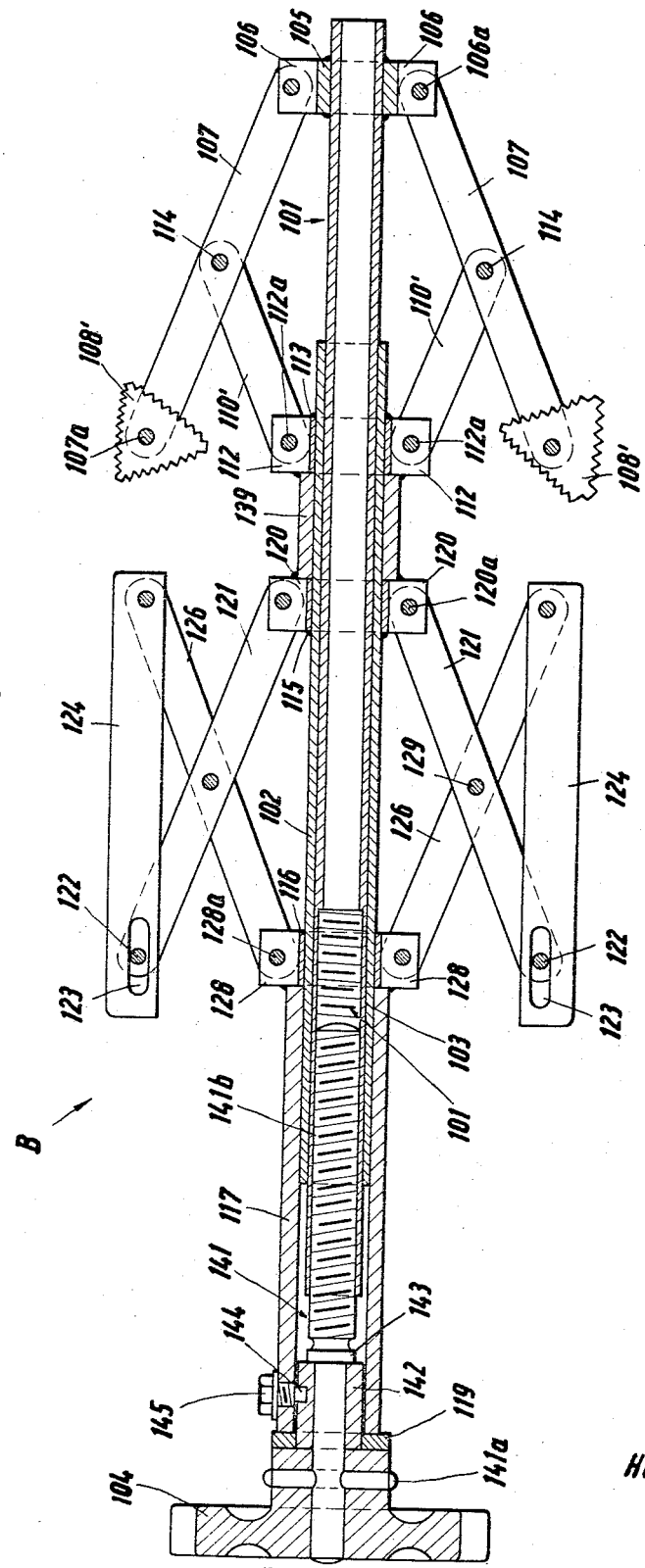

Inventor:
Helmuth Jacobsen
by Michael J. Striker
his attorney

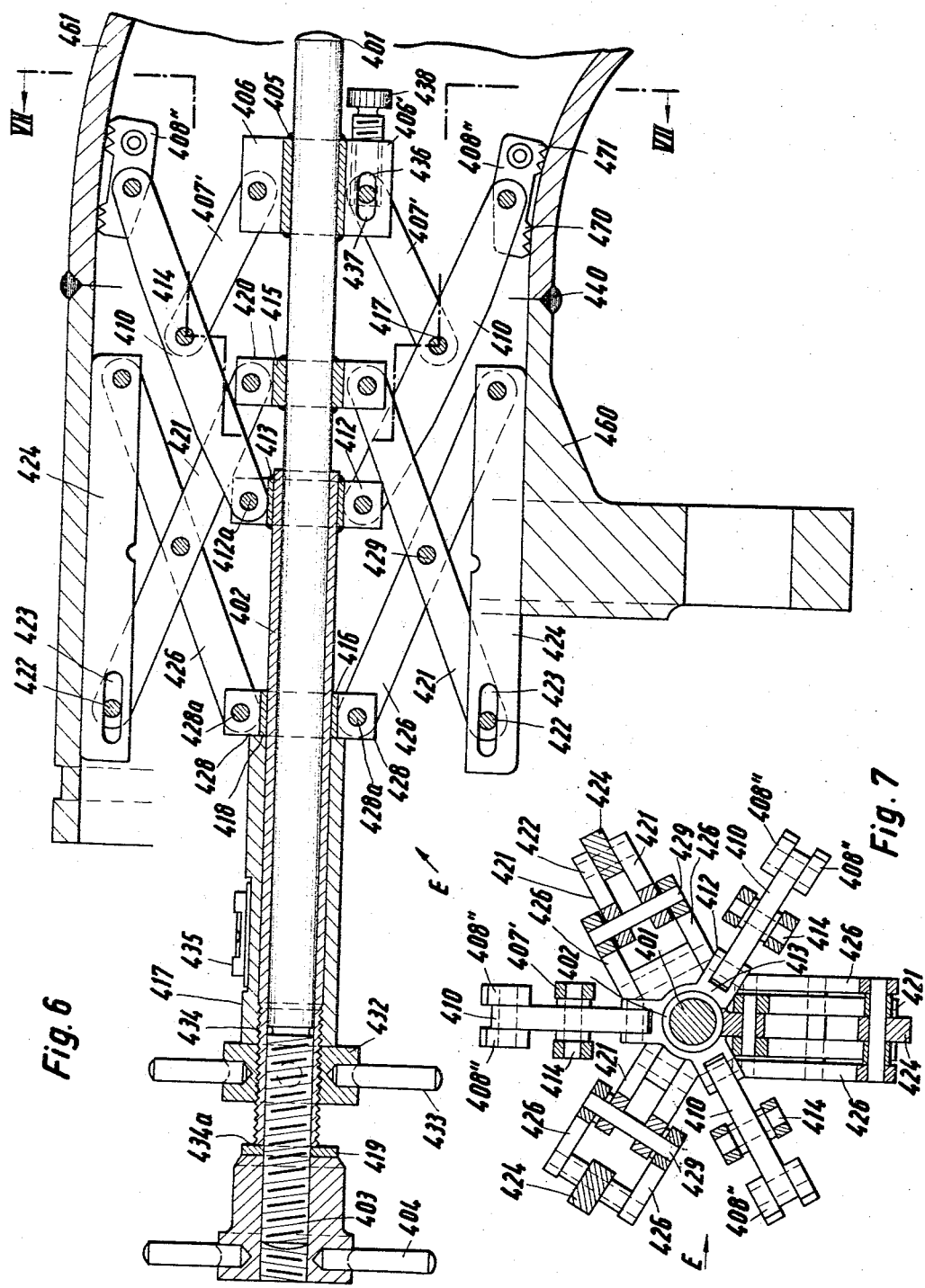

Inventor:
Helmuth Jacobsen
by Michael J. Striker
his attorney

United States Patent Office 3,330,021
Patented July 11, 1967

3,330,021
PIPE ALIGNING TOOL
Helmuth Jacobsen, P.O. Box 552, Bad Godesberg-Mehlem, Germany
Filed June 15, 1964, Ser. No. 375,181
Claims priority, application Germany, June 19, 1963,
R 35,477; July 2, 1963, R 35,563
24 Claims. (Cl. 29—200)

The present invention relates to pipe aligning tools. More particularly, the invention relates to a highly versatile pipe aligning tool which is especially suited to serve as a means for facilitating welding of pipe sections, pipe bends, elbows and similar tubular bodies to each other.

It is an important object of the present invention to provide a very simple, easy-to-handle and exceptionally accurate pipe aligning tool which may be utilized in connection with butt- or lap-welding of neck flanges, rims, pipe reducers, short pieces of pipe, flange rings, complete pipe sections, branches of any configuration and many other tubular bodies to each other.

Another object of the invention is to provide a pipe aligning tool which is capable of aligning pipe sections of different internal diameters, which may align a bent pipe section with a straight pipe section, which may be rapidly attached to or detached from a pair of tubular bodies, and which may be manipulated by semi-skilled persons.

A further object of my invention is to provide an improved actuating mechanism for moving the shoe members of an aligning tool into and out of strong frictional engagement with the internal surfaces of tubular bodies and which may be readily converted for use in connection with straight or bent tubular bodies.

An additional object of the invention is to provide a pipe aligning tool which is capable of indicating the inclination of the aligned tubular bodies and in which a single actuating device may suffice to move the shoe members into or out of engagement with two pieces of pipe or the like.

Still another object of the invention is to provide a pipe aligning tool which, in addition to serving as an exceptionally practical accessory in welding of pipe sections or the like, is equally useful to facilitate marking out pipe cuts, for machining or for assembly operations, for tack or finish welding pipe connections with equal or different diameters, and for many analogous purposes wherever two tubular bodies must be maintained in a position of coaxial alignment with each other.

A concomitant object of the invention is to provide a pipe aligning tool which is constructed and assembled in such a way that its parts do not impede a welding, machining or assembling operation which follows the alignment of tubular sections with reference to each other, wherein all parts which are subjected to substantial bending or other stresses are properly reinforced in an exceptionally simple manner, and wherein a defective component may be rapidly and conveniently exchanged without necessitating complete dismantling of the remainder of the tool.

Still another object of the invention is to provide a pipe aligning tool which may be manipulated by hand or by a motor and which may be furnished in any desired size or shape to suit a given aligning operation.

Another object of the invention is to provide an aligning tool wherein one or more shoe members which move in actual engagement with the sections of piping or the like may be adjusted individually, and wherein such adjustments may be effected in an exceptionally simple manner and with little loss in time.

A further object of the invention is to provide improved clamping devices which may be utilized in a pipe aligning tool of the above outlined characteristics.

With the above objects in view, one feature of my invention resides in the provision of a pipe aligning tool which comprises an outer sleeve, an inner sleeve axially movably received in and having an end portion extending beyond one end of the outer sleeve, a solid or tubular shaft axially movably received in and having an end portion extending beyond the end portion of the inner sleeve, a first group of clamps each including a pair of articulately connected links having inner ends each pivotably secured to a different one of the aforementioned end portions, a second group of clamps each including a pair of articulately connected links having inner ends one of which is pivotably connected with one of the end portions and the other of which is movable axially of the inner sleeve when the end portion of the inner sleeve moves toward the nearest end of the outer sleeve, a shoe member connected to at least one of each pair of links at a point which is spaced from the inner end of the respective link, and actuating means for moving the sleeves and the shaft with reference to each other so that the shoe members of the first group of clamps are moved radially of the shaft in response to relative movement between the end portions and that the shoe members of the second group of clamps are moved radially of the shaft in response to relative movement between the outer sleeve and the one end portion. The clamps of each group are spaced angularly about the axis of the shaft and each group comprises at least three clamps. The shoe members of each group of clamps may be moved into strong engagement with the internal surface of a pipe section or the like so that the two sections are automatically aligned with each other when the actuating means is caused to move the shoe members radially outwardly after the clamps are accommodated in the interior of the respective pipe sections.

The novel features which are considered as characteristic of the invention are set forth in particular in the appended claims. The improved aligning tool itself, however, both as to its construction and its mode of operation, together with additional features and advantages thereof, will be best understood upon perusal of the following detailed description of certain specific embodiments with reference to the accompanying drawings, in which:

FIG. 1 is a partly elevational and partly sectional view of an aligning tool which is constructed in accordance with a first embodiment of my invention, the section being taken in the direction of arrows as seen from the line I—I of FIG. 2;

FIG. 2 is a composite transverse section as seen in the direction of arrows from the line II—II of FIG. 1;

FIG. 3 is a partly elevational and partly sectional view of a second aligning tool which constitutes a slight modification of the tool shown in FIGS. 1 and 2 in that it may align straight pipe sections to pipe bends;

FIG. 6 is a similar partly elevational and partly sectional view of a fifth aligning tool which may serve as a means for aligning a straight pipe section or the like with a short-radius bend;

Figure 8:
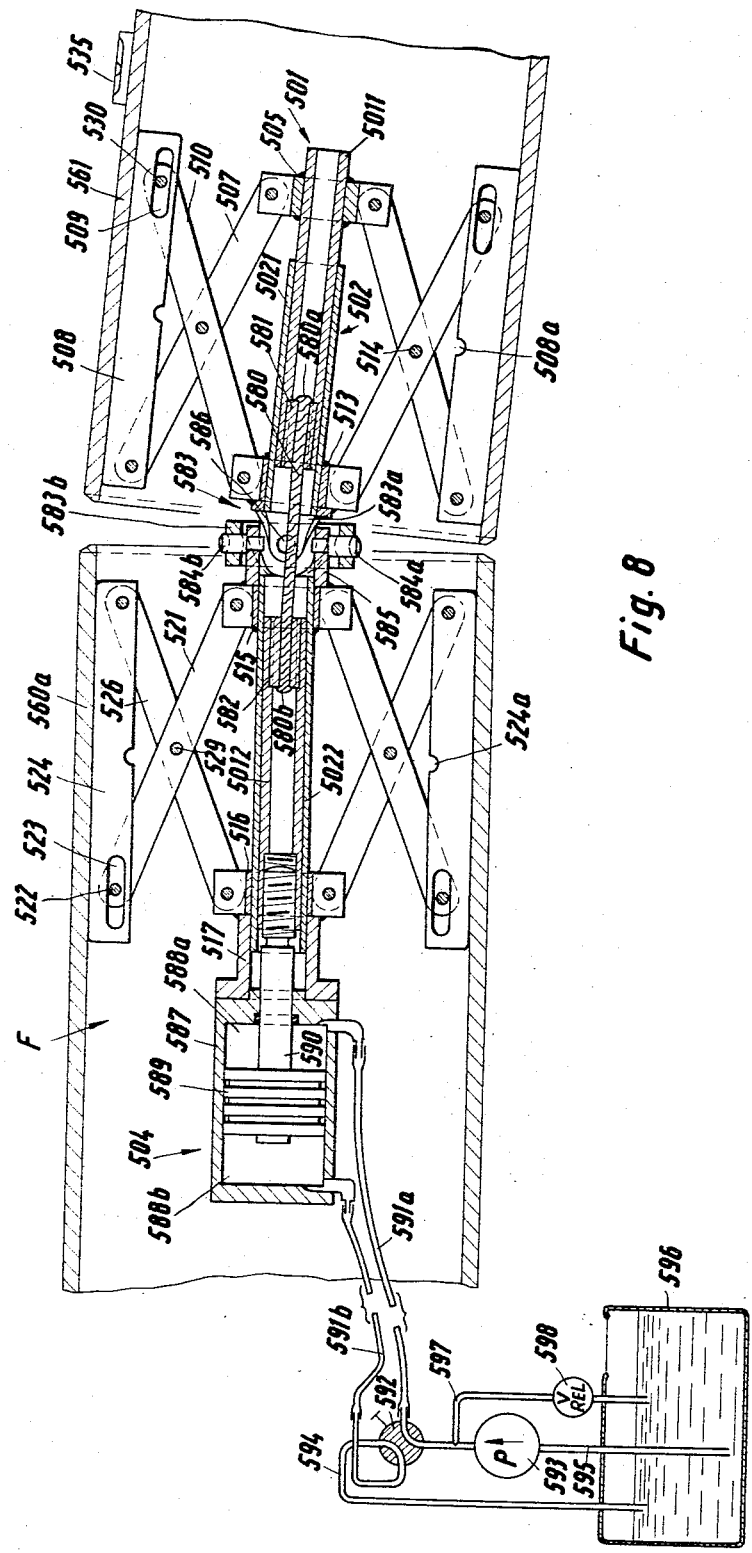

FIG. 7 is a composite transverse section substantially as seen in the direction of arrows from the line VII—VII of FIG. 6; and FIG. 8 is a longitudinal section through a heavy-duty centering tool which is provided with fluid-operated actuating means and wherein the shaft and the inner sleeve comprise sections which are articulately connected to each other so that one of each pair of sections may be tilted with reference to the other section.

Referring first to FIGS. 1 and 2, there is shown a lightweight aligning tool A which comprises an elongated solid shaft 1 telescopically received in an inner sleeve 2 and having end portions extending beyond both axial ends of the inner sleeve. The shaft 1 is movable in the axial direction of the inner sleeve 2 or vice versa and its left-hand end portion, as viewed in FIG. 1, is provided with external threads 3 which mate with internal threads provided in the central portion or hub of an actuating member here shown as a hand wheel 4. The right-hand end portion of the shaft 1 which extends beyond the right-hand end portion of the inner sleeve 2 carries a collar 5 secured thereto by brazing, welding, soldering or the like, and this collar 5 carries three equidistant radially outwardly extending apertured lugs 6 each of which supports a pivot pin 6a extending at right angles to the axis of the shaft 1. The right-hand end portion of the sleeve 2 is surrounded by a similar collar 13 which is rigidly secured thereto and which carries three apertured lugs 12 each of which is coplanar with one of the lugs 6. Each lug 12 is traversed by a pivot pin 12a which supports one end of a pivotable link 10, and these links cross links 7 whose inner end are pivotably secured to the pins 6a. A pivot 14 connects the central portions of crossing links 7, 10 and the outer ends of these links carry pivot pins 7a, 30 which serve to support elongated shoe members 8, also called locating rails. Each pin 7a is fixed to one end of the respective shoe member 8 and the other end of each shoe member 8 is provided with an elongated cam slot 9 to receive the respective pin 30. Thus, the pins 30 actually constitute cam followers and serve to travel back and forth along the respective cam slots 9, depending upon whether the operator desires to move the shoe members 8 toward or away from the axis of the shaft 1. The parts 5–7a, 9–10, 12–14 and 30 together constitute three toggle mechansms which serve to reciprocate the respective shoe members 8 radially of the shaft 1 and each toggle mechanism constitutes with the respective shoe member 8 a clamp which serves to engage the internal surface of a pipe section or the like and to center the same about the shaft 1. The actuating member 4 cooperates with the shaft 1 and sleeve 2 to move the shoe members 8 radially of the shaft by causing the collars 5, 13 to move axially toward or away from each other.

The sleeve 2 carries a third collar 15 which is rigidly secured thereto by welding or the like and which is provided with three equidistant radially outwardly extending apertured lugs 20 each traversed by a pivot pin 20a which is perpendicular to the axis of the shaft 1. Each pin 20a is connected with the inner end of an elongated link 21 whose central portion is articulately connected with the central portion of a second link 26 by means of a pivot 29, and the inner ends of the links 26 are pivotable about pins 28a mounted in apertured lugs 28 extending radially outwardly from a fourth collar 16 which is slidable about and in the axial direction of the inner sleeve 2. The outer ends of the links 21 carry follower pins 22 which are received in elongated cam slots 23 provided at the left-hand ends of three shoe members 24, and the right-hand end of each shoe member 24 carries a pivot pin 26a which is fixed to the outer end of the respective link 26. Thus, the parts 15–16, 20–23, 26 and 28 also form three toggle mechanisms each of which serves to reciprocate one of the shoe members 24 radially toward and away from the shaft 1, and each shoe member 24 constitutes with the respective toggle mechanism a clamp which may engage the internal surface of a second pipe section or the like, not shown in FIGS. 1 and 2, in such a way that the axes of the two pipe sections coincide with the axis of the shaft 1 whereby the ends of the two pipe sections may be welded, soldered or otherwise connected to each other. The means for reciprocating the shoe members 24 toward and away from the axis of the shaft 1 includes the shaft 1, the inner sleeve 2, the hand wheel 4 and an outer sleeve 17 which surrounds the left-hand end portion of the inner sleeve and whose right-hand etnd 18 normally abuts against the collar 16. The other end of the outer sleeve 17 abuts against a ring 19 which is adjacent to the hub of the hand wheel 4. The aligment tool of FIGS. 1 and 2 may be modified by providing a permanent or detachable connection between the collar 16 and sleeve 17, i.e., the collar 16 may constitute a component part (the right-hand end portion) of the outer sleeve. The ring 19 serves as a means for preventing excessive wear on the outer sleeve 17 when the hand wheel 4 rotates. It is further to be noted that, while the inner sleeve 2 may move axially of, it cannot rotate with references with the shaft 1 or vice versa because the toggle mechanisms for the shoes 8 prevent such angular displacements. The same applies for the inner sleeve 2 and outer sleeve 17 if the latter is rigid with the collar 16.

The aligning tool of FIGS. 1 and 2 operates as follows:

The right-hand portion of the tool is inserted into the abutting end portions of two pipe sections which must be aligned prior to welding with each other so that the shoe members 8 extend into the one and that the shoe members 24 extend into the other pipe section. The operator then rotates the wheel 4 (either by hand or by means of a suitable power operated machine) in a sense to move the shaft 1 in a direction to the left, as viewed in FIG. 1. This causes the collar 5 to advance axially toward the collar 13 whereby the shoe members 8 move radially outwardly and engage the internal surface of the respective pipe section so that the pipe section is concentric with the inner sleeve 2 and coaxial with the shaft 1. Once the shoe members 8 are anchored in the respective pipe section, the shaft 1 is automatically held against further axial movement and, on further rotation of the hand wheel 4, the latter begins to travel in a direction to the right, as viewed in FIG. 1, to move the outer sleeve 17 in the same direction and to shift the collar 16 axially toward the collar 15. Such movement of the collar 16 causes the shoe members 24 to move radially outwardly and to engage the internal surface of the second pipe section which is automatically aligned with the other pipe section so that the two pipe sections are now ready to be welded to each other. The aligning tool of FIGS. 1 and 2 may be used in connection with pipe sections of equal or unequal internal diameters and its aligning action is exceptionally accurate because the shoe members 8, 24 are of considerable length, as seen in the axial direction of the tool. This tool is especially suited for aligning two straight pipe sections or a pair of sections which have straight portions adjacent to the ends which must be welded or otherwise secured to each other.

The shoe members 8, 24 may be moved simultaneously or sequentially, depending on the resistance which they meet while the hand wheel 4 rotates in a sense to move them radially outwardly and away from the shaft 1. It goes without saying that the toggle mechanisms may be subjected to the bias of suitable springs or the like which tend to move the shoe members 8 and 24 to the inner end positions thereof, i.e., into positions in which the shoe members are located nearest to the shaft 1. Such return means may comprise suitable helical springs 11 and 27 two of which are shown in FIG. 1 and act between the arms 7, 10 and 21, 26 respectively. Such springs insure that the aligning tool is automatically separated from the pipe sections as soon as the hand wheel 4 is rotated in a sense to permit axial movements of the shaft 1 and sleeves 2, 17 with reference to each other.

While FIGS. 1 and 2 show that each lug 6 is coplanar with one of the lugs 12, 20 and 28, it is often advisable to arrange the shoe members 8 in such a way that they are staggered angularly with reference to the shoe members 24, or vice versa. For example, each of the shoe members 24 could be mounted in a position angularly displaced through 60 degrees with reference to the position of FIGS. 1 or 2 so that the angular distance between each pair of shoe members would be 60 degrees because the angular distance between the shoe members 8 or 24 is preferably 120 degrees. It is equally possible to provide four, five or more equidistant shoe members 8 or 24, particularly if the two pipe sections are to be aligned with utmost precision. Thus, each group of clamps comprises more than two clamps and the clamps of each group are preferably equidistant from each other, as seen in the circumferential direction of the shaft 1. If the internal diameter of the pipe section which receives the shoe members 24 exceeds the internal diameter of the other pipe section, the outer sleeve 17 is moved axially until the shoe members 24 move radially and beyond the shoe members 8 to engage the internal surface of the respective pipe section.

FIG. 2 shows that each link 7, 10, 21 and 26 actually comprises two spaced parallel links so that each lug 6, 20 and 28 is straddled by the inner ends of two links, and each pivot 14, 29 comprises two coaxial sections.

Since the shoe members 8 and 24 are of considerable length, the aligned pipe sections are held against tilting even if they undergo substantial bending stresses. The outer end faces of the shoe members may be coated with layers of wear-resistant and/or friction generating material to prevent excessive wear and to insure strong frictional engagement with the pipe sections.

FIG. 3 illustrates a modified aligning tool B wherein the shaft 1 of FIGS. 1 and 2 is replaced by a tubular shaft 101 having an internally threaded end portion 103 and the actuating means comprises a hand wheel 104 including a rod 141 with an externally threaded portion 141b which mates with the end portion 103 of the shaft 101. The left-hand end portion of the rod 141 extends beyond the shaft 101 and is non-rotatably secured to the hand wheel 104 proper by means of a diametral pin 141a. The rod 141 extends through a motion transmitting annulus 142 which extends between a flange 143 of the rod 141 and the hub of the hand wheel 104. The left-hand end portion of the shaft 101 is surrounded by an elongated inner sleeve 102 whose left-hand end portion is surrounded by an outer sleeve 117. This outer sleeve is provided with one or more radially extending tapped bores for one or more coupling screws 145 whose tips extend into radial recesses 144 provided in the peripheral surface of the annulus 142 so that the outer sleeve is compelled to share all axial movements of the annulus. A friction reducing ring 119 is inserted between the left-hand end of the outer sleeve 117 and the adjacent end face of the hand wheel 104 to avoid wear on the outer sleeve when the hand wheel 104 rotates. The manner in which the three equidistant clamps including the shoe members 124 are pivotably secured to the sleeves 102, 117 is the same as described in connection with FIGS. 1 and 2 and, therefore, the parts of the corresponding toggle mechanisms are identified by the same reference numerals each preceded by the digit 1. The collar 116 is welded to the right-hand end of the outer sleeve 117 so that it is compelled to share all axial movements of the annulus 142.

The other three clamps which are secured to the right-hand end portion of the shaft 101 and to the right-hand end portion of the inner sleeve 102 are somewhat different insofar as the elongated shoe members 8 of FIGS. 1 and 2 are replaced by substantially triangular shoe members 108' each of which is provided with ribbed or otherwise roughened pipe-engaging surfaces. Each of these shoe members 108' is pivotable about an eccentric pin 107a provided at the outer end of the respective link 107. The links 10 of FIGS. 1 and 2 are replaced by shorter links 110' each of which is secured to a pivot 114 and to a pin 112a. The remaining parts of the toggle mechanisms for the shoes 108' are identical with those described in connection with FIGS. 1 and 2 and each thereof is identified by a similar reference numeral preceded by the digit 1. It is further to be noted that the collars 113, 115 which are welded to the right-hand end portion of the inner sleeve 102 are also welded to a tubular spacer 139. The purpose of the spacer 139 is to reinforce the aligning too and to allow for transmission of greater expanding forces. If desired, the spacer 139 may be welded, bolted or otherwise fixedly secured to the inner sleeve 102.

The operation of the aligning tool which is shown in FIG. 3 is analogous to that of the aligning tool of FIGS. 1 and 2. Thus, when the shoe members 108' are received in the end portion of a first pipe section or pipe bend and the shoe members 124 are received in the end portion of a second pipe section which is to be welded to the first pipe section or bend, the operator begins to rotate the hand wheel 104 in a sense to drive its rod 141 into the shaft 101 whereby the collar 105 moves in a direction to the left and causes the shoe members 108' to move radially outwardly and into strong clamping and centering engagement with the internal surface of the respective pipe section or pipe bend. Once the shaft 101 is held against further axial movement and if the hand wheel 104 continues to rotate in a sense to move the outer sleeve 117 axially of and toward the collar 115, the collar 116 moves in the same direction and causes the shoe members 124 to move radially outwardly and into clamping and centering engagement with the second pipe section which is then aligned with the first pipe section or bend and may be welded thereto. The separation of the aligning tool is effected by rotating the hand wheel 104 in the opposite direction. The shaft 101 is then moved in a direction to the right and the outer sleeve 117 is moved in a direction to the left, as viewed in FIG. 3, whereby the shoe members 108', 124 are caused to be retracted and to move radially toward the inner sleeve 102.

The shoe members 108' automatically find optimum positions with reference to the internal surface of the respective pipe section or pipe bend so that each thereof engages the pipe section or bend with one of its ribbed surfaces to insure satisfactory alignment of the pipe sections. It is obvious that the aligning tool of FIG. 3 may comprise four or more shoe members 108' and/or 124, and that the shoe members 108' may be staggered angularly with reference to the shoe members 124, or vice versa.

Figure 4:
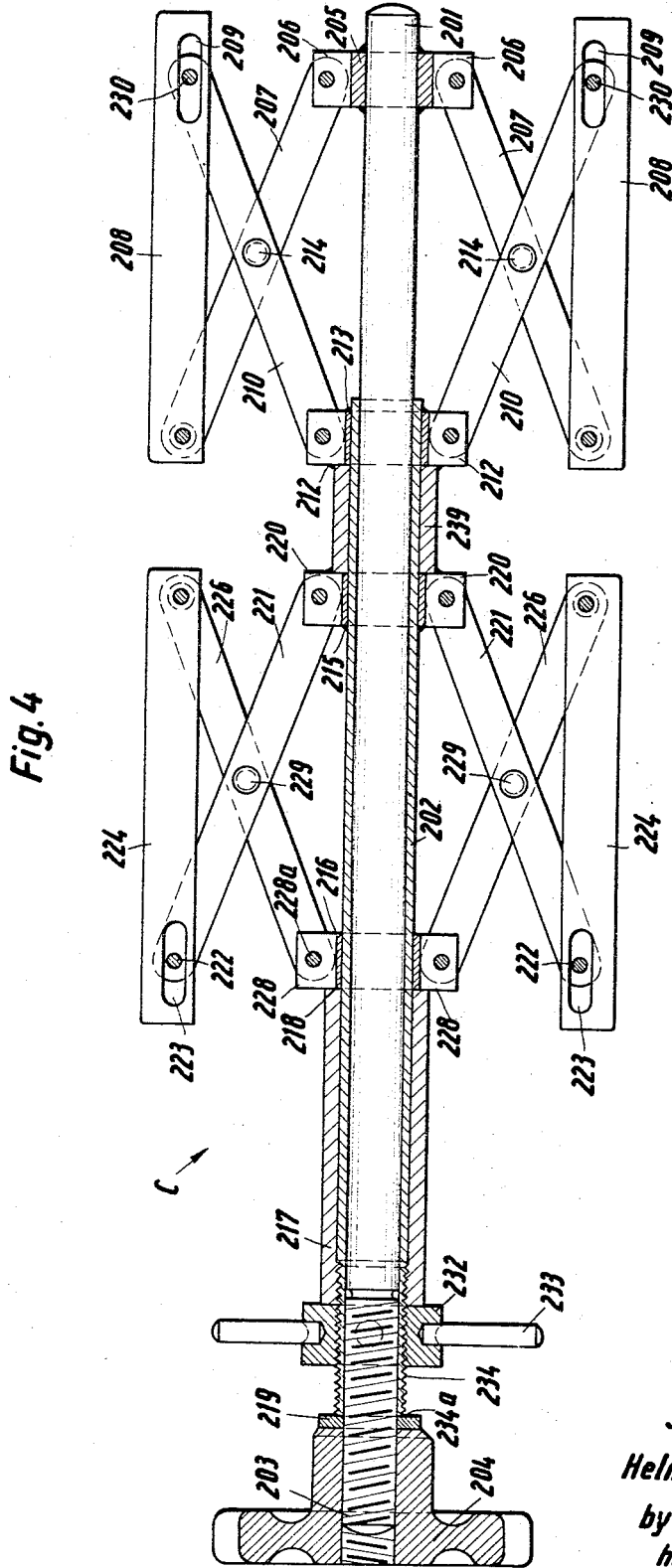
FIG. 4 is a partly elevational and partly sectional view of a third aligning tool which comprises two actuating members.

The heavy duty aligning tool C of FIG. 4 is quite similar to the aligning tool of FIGS 1 and 2, and many of its component parts are identified by the same reference characters, each preceded by the digit 2. The main difference between the two tools is in the construction of the actuating means for the clamps which include shoe members 224. Thus, the outer sleeve 217 which abuts against and which may be welded to the collar 216 for the lugs 228 is shiftable axially of the inner sleeve 202 by means of a second actuating member here shown as a hand wheel 232 which is provided with internal threads to mesh with external threads 234 provided on the left-hand end portion of the inner sleeve 202. The left-hand end face 234a of the inner sleeve 202 abuts against a friction reducing ring 219 which is adjacent to the hub of the hand wheel 204. This hand wheel 204 is in mesh with the externally threaded left-hand end portion 203 of the solid shaft 201. It will be noted that the second hand wheel 232 is provided with radially outwardly extending spokes 233 to facilitate rotation thereof when the operator desires to move the shoe members 224 radially outwardly and into firm clamping engagement with the internal surface of a pipe section, or the like. The shoe members 208 are movable radially outwardly in response to rotation of the hand wheel 204 in a sense to move the shaft 201 in a direction to the left or to move the inner sleeve 202 in a direction to the right, as viewed in FIG. 4.

The length of the threads on the end portions 203, 234 and the maximum distance between the collars 205, 213 and 215, 216 determines the operative range of the aligning tool by determining the maximum distance between the shoe members 208, 224 and the shaft 201. It is obvious that the range of the shoe members 208 need not necessarily equal the range of the shoe members 224.

The collars 213, 215 are held apart by a tubular spacer 239 which is welded thereto and which may, but need not, be secured to the right-hand end portion of the inner sleeve 202. It was found that the portion of the aligning tool which is surrounded by the spacer 239 must withstand maximal stresses when the tool is in actual use and, therefore, the spacer serves as a very simple but highly effective stiffening and reinforcing device for the actuating means. Of course, the two inner collars 213, 215 may be dispensed with and the lugs 212, 220 may be welded to or integrally formed with the spacer 239. In such modified aligning tools, the spacer must be secured to or is integral with the inner sleeve 202.

Figure 5:
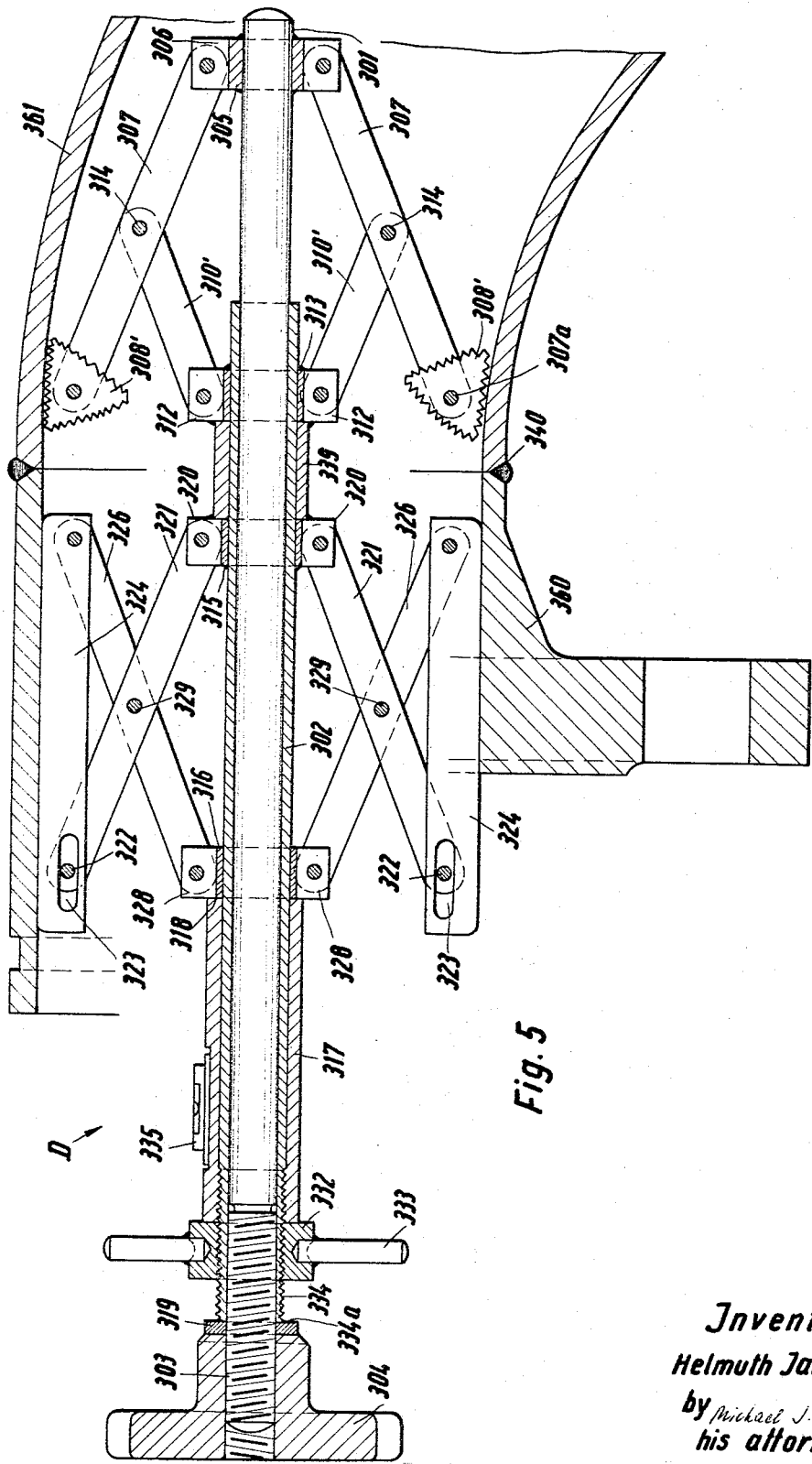
FIG. 5 is a partly elevational and partly sectional view of a fourth aligning tool which bears a certain resemblance to the tool of FIG. 3 in that it may also serve as a means for aligning a straight pipe section with a pipe bend or elbow.

The aligning tool D of FIG. 5 combines certain features of the tools which are shown in FIGS. 3 and 4, and its component parts are designated by similar reference characters, each preceded by the digit 3. Thus, the first group of clamps which are movable radially in response to relative movement between the right-hand end portion of the shaft 301 and the right-hand end portion of the inner sleeve 302 (by means of the hand wheel 304) comprises triangular shoe members 308′ which corerspond to the shoe members 108′ of FIG. 3. The shoe members 324 reciprocably radially in response to relative axial movement between the sleeves 302, 317 (by means of the second hand wheel 332). The outer sleeve 317 supports a spirit level 335 which indicates to the operator whether or not the axis of a flanged pipe section 360 is horizontal. This pipe section has been joined to a pipe bend 361 by means of an annular welding seam 340. The shoe members 308′ engage the internal surface of the pipe bend 361 and hold its left-hand end portion in coaxial alignment with the pipe section 360. The bend 361 is one with a comparatively large radius of curvature and the spirit level 335 enables the operator to make sure that the internal diameter of this pipe bend is properly engaged by the shoe members 308′.

In many instances, the annular seam 340 may be replaced by a series of spot welds as is well known in the art. The spacer 339 is welded to the collars 313, 315 and reinforces the respective parts of the shaft 301 and inner sleeve 302.

Referring finally to FIGS. 6 and 7, the aligning tool E maintains the left-hand end portion of a pipe bend 461 with a comparatively small radius of curvature in a position of coaxial alignment with a flanged pipe section 460 which is welded thereto by a seam 440. The inner sleeve 402 of this tool E is comparatively short, i.e., it terminates at a point between the collars 415, 416 so that the collar 415 for the links 421 may be secured to the exposed right-hand end portion of the solid shaft 401. Consequently, the links 410, 421 actually overlap but are not secured to each other. As shown in FIG. 7, the pairwise arranged shoe members 408″ which are secured to the outer ends of the links 410 are angularly staggered with reference to the shoe members 424 which are articulately connected with the outer ends of the links 421, 426. The links 421, 426 are disposed in pairs. Owing to the fact that the collars 405, 415 are secured to the ring-hand end portion of the shaft 401, the axial distance between the shoe members 424 and 408″ remains unchanged in all positions of the two groups of clamps. The shoe members 408″ are forked, i.e., each thereof comprises two axially spaced corrugated surface portions 470, 471 each of which may engage the internal surface of the pipe bend 461. The lug 412 is forked so that the inner end of each link 410′, is received between two spaced portions of the respective lug 412. One of the lugs 406 (marked 406′ in FIG. 6) is provided with an axially parallel elongated slot 436 which receives a guide pin 437 secured to the inner end of the respective link 407′. This guide pin is secured to the tip of an adjusting bolt 438 which meshes with an internally threaded portion of the lug 406′ and serves to regulate the position of the pin 437, as seen in the axial direction of the shaft 401. Such adjustments enable the corresponding shoe member 408″ to change its distance from the shaft 401 irrespective of the axial movement of this shaft with reference to the sleeve 402 or vice versa. In other words, the adjusting bolt 438 serves to adjust the radial distance betwen the respective shoe member 408″ and the shaft 401 irrespective of the angular position of the hand wheel 404. This latter hand wheel is also provided with radial spokes corresponding to the spokes 433 of the second hand wheel 432. The provision of the adjusting bolt 438 is of considerable advantage when the aligning tool E is used to center a pipe which begins to curve immediately adjacent to the open end thereof because one of the shoe members 408″ then extends further away from the shaft 402 in order to insure that the bend is properly aligned with a straight pipe section. It goes without saying that each of the shoes 108′ (FIG. 3) or 408″ (FIGS. 6 and 7) may be controlled by an adjusting member analogous to the bolt 438 of FIG. 6.

The aligning tool E of FIGS. 6 and 7 is operated as follows:

In order to move the shoe members 408″ radially outwardly, the operator inserts these shoe members through the pipe section 460 and into the left-hand end of the pipe bend 461, and thereupon rotates the hand wheel 404 in a sense to move the shaft 401 in a direction to the left, as viewed in FIG. 6. This moves the collar 405 toward the collar 413 whereby the shoe members 408″ move into firm clamping engagement with the internal surface of the bend 461. The position of the lowermost shoe member 408″ (as viewed in FIG. 6) is adjusted in advance by proper manipulation of the bolt 438. As the shaft 401 moves in a direction to the left, it causes the collar 415 to move toward the collar 416 whereby the shoe members 424 move radially outwardly and into clamping engagement with the internal surface of the pipe section 460. The two sections are aligned and may be connected by the seam 440. The spirit level 435 on the outer sleeve 417 enables the operator to make sure that the axis of the shaft 401 remains horizontal.

The second hand wheel 432 is utilized when the internal diameter of the bend 461 differentiates from the internal diameter of the pipe section 460. For example, and if the internal diameter of the section 460 exceeds the internal diameter of the bend 461, the operator thereupon rotates the hand wheel 432 in a sense to move the collar 416 toward the collar 415 whereby the shoe members 424 move radially outwardly and into strong clamping engagement with the internal surface of the pipe section 460.

The outer sleeve 417 may but need not be secured to the collar 416, i.e., this collar may constitute an integral part of the outer sleeve.

All other reference characters shown but not specifically mentioned in connection with FIGS. 6 and 7 correspond to those described in connection with FIGS. 1 to 5 and each thereof is preceded by a digit 4.

I wish to mention here that the aligning tool of my invention may be utilized for a large number of other purposes, for example, in centering a flange on or adjacent to a straight or arcuate pipe section, in centering a straight pipe which is received with play in a larger pipe, for temporarily or permanently holding two pipe sections in a position of coaxial alignment with each other while such pipes may but need not actually abut each other, in forming T's, V's, Y-joints and similar branches, and for many other purposes. Its parts may be made of steel, aluminum or another suitable metallic material. Certain parts may be made of plastic and, in some instances, the axially movable or rotary parts may be mounted in suitable antifriction bearings to reduce wear and to insure that little effort will be required to move the shoe members with reference to the shaft. It is also possible to rotate the hand wheels by suitable electric, hydraulic or pneumatic motors and/or to replace the hand wheels by crank handles or other types of manually manipulatable actuating devices.

FIG. 8 illustrates a tool F which may be utilized for centering of comparatively heavy and bulky pipe sections or the like. This tool is constructed with a view to prevent permanent damage to its parts under severe working conditions.

The shaft 501 of the tool F comprises two relatively movable elongated sections 5011, 5012 which are connected to each other by a swivel joint including an elongated flexible element 580 in such a way that the section 5011 may swivel with reference to the section 5012 or vice versa. The flexible element 580 is a length of cable whose end portions 580a, 580b are secured to threaded plugs 581, 582. The plug 581 meshes with an internally threaded terminal portion of the section 5011, and the plug 582 meshes with a similarly threaded terminal portion of the section 5012. As shown, cable 580 extends through a passage defined by a second swivel joint 583 which connects two elongated sections 5021, 5022 of an inner sleeve 502. The joint 583 is a universal joint which includes a first coupling element 583a rigid with the section 5021 and a second coupling element 583b which is pivotable about the common axis of two radial pivot pins 584a, 584b mounted on a short ring 585 which is welded to the adjacent end of the section 5022. The connection between the coupling elements 583a, 583b comprises two coaxial pins 586 (only one shown in FIG. 8). The common axis of the pins 586 is normal to the common axis of the pins 584a, 584b so that the section 5021 may swivel with reference to the section 5022 or vice versa. The joint 583 is located intermediate the sections 5011, 5012 so that the section 5011 may swivel with reference to the section 5012 when the section 5021 is caused to swivel with reference to the section 5022 or vice versa. It is further to be noted that the two joints are provided intermediate the two groups of clamps each of which is constructed in the same way as described in connection with FIGS. 1 and 2. The reference numerals denoting certain components of these groups of clamps are the same as used in connection with FIG. 1 with the exception that each thereof is preceded by the digit 5. The collar 516 is rigidly secured to the right-hand end of an outer sleeve 517 whose left-hand end is secured to a fluid-operated cylinder 504 which constitutes the actuating means for moving the shaft 501 and the sleeves 502, 517 longitudinally with reference to each other. The cylinder 504 comprises a housing 587 which defines two cylinder chambers 588a, 588b separated by a reciprocable piston 589 having a piston rod 590 which is rigidly but detachably secured to the left-hand section 5012 of the shaft 501. The cylinder 504 is of the double-acting type and is provided with supply conduits 591a, 591b leading to a regulating valve 592 which includes a rotary valve member arranged to connect the conduits 591a, 591b with the pressure side of a pump 593 or with a return conduit 594. The conduit 595 for the pump 593 dips into a tank 596 which contains a supply of hydraulic fluid (e.g., coil), and this conduit 595 communicates with a further conduit 597 which contains a pressure relief 598.

When the valve member of the valve 592 is moved to the position of FIG. 8, the pump 593 delivers pressure fluid into the chamber 588a so that the piston 589 moves in a direction to the left and draws the section 5011 of the shaft 501 into the section 5021 of the inner sleeve 502. Consequently, the shoe members 508 will move radially outward and will engage the internal surface of a pipe section 561. When the clamps which include the shoe members 508 cannot expand any further, the housing 587 of the cylinder 504 begins to move in a direction to the right and entrains the outer sleeve 517 so that the shoe members 524 of the other group of clamps are compelled to move radially outwardly and to engage the internal surface of a second pipe section 560a. Since the joints between the sections 5011, 5012 and 5021, 5022 allow the shoe members 508 to remain inclined with reference to each other, the pipe sections 560a, 561 need not be moved in a position of coaxial alignment when the tool F of FIG. 8 is put to actual use. Such coaxial alignment may be achieved by resorting to a spirit level 535 (shown above the pipe section 561).

If the operator turns the valve member of the valve in a counterclockwise direction, the conduit 591a will communicate with the return conduit 594 and the conduit 591b will receive pressure fluid from the conduit 593. The piston 589 is then moved in a direction to the right, as viewed in FIG. 8, and the shoe members 508, 524 may be moved away from the respective pipe section. Of course, if the links 507, 510 and 421, 426 are connected with springs in a manner as shown in FIG. 1, the cylinder 504 may be replaced by a single-acting cylinder. Also, this cylinder 504 may be modified by providing in the chamber 588b a spring which tends to move the shoe members 508, 524 radially inwardly.

The shoe members 508, 524 are provided with cutouts 508a, 524a to accommodate portions of the pivots 514, 529 when the tool F is collapsed by admitting fluid into the chamber 588b.

The slots 509, 523 and the corresponding pins 530, 522 are provided at such ends of the shoe members 508, 524 which are distant from the collars 513, 515. This is of advantage because when the pipe sections 560a, 561 are to be welded to each other, the weld is formed in the zone between the collars 513, 515 which means that the slotted ends of the shoe members are not likely to be subjected to undesirably high temperatures. In other words, the sensitive portions of the shoe members are located at a substantial distance from the welding zone. This also holds true for the slidable collars 505 and 516 which are more sensitive to heating than the fixed collars 513, 515.

The tool of FIG. 8 may be modified to resemble the tools shown in FIGS. 3, 4 or 5. Furthermore, this tool may be modified in a number of ways by replacing the plugs 581, 582 with permanent connections between the sections 5011, 5012 and the cable 580, and/or by replacing the universal joint 583 with a flexible coupling or the like. For example, the end portions of the cable 580 may be pinned, brazed or welded to the respective sections of the shaft 501. All that counts is to construct the shaft 501 and the inner sleeve 502 in such a way that their sections may swivel with reference to each other in a zone which is located between the pipe sections, i.e., in the gap between the shoe members 508, 524. The advantages of this tool will be more readily understood by considering that the tool may be used for centering of exceptionally heavy sections at least one of which may be some 24–36 feet long so that, were the shaft 501 and inner sleeve 502 rigid, the tool would bend and would become useless for future alignment work. The joints between the sections of the shaft and inner sleeve will allow one group of clamps to tilt when the two pipe sections are centered so that the tool will remain intact.

It goes without saying that, in the tool F of FIG. 8, the distance between the shoe members 508 and 524 preferably exceeds the distance between the shoe members in the previously described tools. Also, and if one or both pipe sections are quite long, the tool F may be provided with a suitable extension so that the shoe members may be inserted from without the section 560a or 561. For example, the left-hand section 5021 of the inner sleeve 502 and the outer sleeve 517 may be made much longer so that the cylinder 504 will be located at a considerable distance from the shoe members 524.

The fluid-operated actuating means of FIG. 8 may be used in each of the tools shown in FIGS. 1–7 and, inversely, the actuating means described in connection with FIGS. 1–7 may be used in the tool F of FIG. 8. The section 5012 of the shaft 501 may be connected directly to the piston 589.

In all embodiments of my invention, the axial distance between the two groups of shoe members remains unchanged regardless of the radial position of the shoe members. This is due to the fact that the inner collars (such as the collars 13 and 15 of FIG. 1) are rigidly secured to the inner sleeve 2 so that, and referring for example to FIG. 1, the links 10 and 21 pivot about axes of the pins 12a, 20a which are fixed with reference to the inner sleeve.

Without further analysis, the foregoing will so fully reveal the gist of the present invention that others can, by applying current knowledge, readily adapt it for various applications without omitting features which fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A pipe aligning tool, comprising an outer sleeve; a single inner sleeve axially movably received in and having an end portion extending beyond one end of said outer sleeve; a shaft axially movably received in and having an end portion extending beyond the end portion of said inner sleeve; a first group of clamps each including a pair of articulately connected links having inner ends each pivotably secured to a different one of said end portions; a second group of clamps each including a pair of articulately connected links having inner ends one of which is articulately secured to one of said end portions and the other of which is movable axially of said inner sleeve when the end portion of said inner sleeve moves toward said one end of said outer sleeve or vice versa, the clamps of each of said groups being spaced angularly about the axis of said shaft and each clamp further comprising a shoe member connected with at least one link of the respective pair of links at a point spaced from the inner end of said one link; and actuating means for moving said sleeves and said shaft with reference to each other so that the shoe members of said first group of clamps are moved radially of the shaft in response to relative movement between said end portions and that the shoe members of said second group of clamps are moved radially of the shaft in response to relative movement between said outer sleeve and said one end portion.

2. A pipe aligning tool as set forth in claim 1, wherein each clamp further comprises a pivot articulately connecting the respective pair of links at a point distant from the inner ends of the respective links so that the other end of at least one link of each pair of links extends beyond the respective pivot, and wherein said shoe member is articulately connected to said other end of said one link of each of said clamps.

3. A pipe aligning tool, comprising an outer sleeve; a single inner sleeve axially movably received in and having an end portion extending beyond one end of said outer sleeve; a shaft axially movably received in and having an end portion extending beyond the end portion of said inner sleeve; a first group of clamps each including a pair of articulately connected links having inner ends each pivotably secured to a different one of said end portions; a second group of clamps each including a pair of articulately connected links having inner ends one of which is articulately secured to the end portion of said inner sleeve and the other of which is movable axially of said inner sleeve when the end portion of said inner sleeve moves toward said one end of said outer sleeve or vice versa, the clamps of each of said groups being spaced angularly about the axis of said shaft and each clamp further comprising a shoe member connected with at least one link of the respective pair of links at a point spaced from the inner end of said one link; and actuating means for moving said sleeves and said shaft with reference to each other so that the shoe members of said first group of clamps are moved radially of the shaft in response to relative movement between said end portions and that the shoe members of said second group of clamps are moved radially of the shaft in response to relative movement between said outer sleeve and end portion of said inner sleeve.

4. A pipe aligning tool as set forth in claim 1 and including a spirit level connected with said outer sleeve.

5. A pipe aligning tool, comprising an outer sleeve having a first and second end; a single inner sleeve axially movably received in and having an end portion extending beyond the first end of said outer sleeve; a shaft axially movably received in and comprising an end portion extending beyond the end portion of said inner sleeve, said shaft further comprising external threads adjacent to the second end of said outer sleeve; a first group of clamps each including a pair of articulately connected links having inner ends each pivotably secured to a different one of said end portions; a second group of clamps each including a pair or articulately connected links having inner ends one of which is pivotably secured to one of said end portions and the other of which is movable axially of said inner sleeve when the end portion of said inner sleeve moves toward the first end of said outer sleeve or vice versa, the clamps of each of said groups being spaced angularly about the axis of said shaft and each clamp further comprising a shoe member connected with at least one link of the respective pairs of links at a point spaced from the inner end of said one link; and a hand wheel having an internally threaded portion meshing with said shaft, said hand wheel being adjacent to the second end of and being arranged to shift said outer sleeve so that said shoe members are moved radially outwardly of said shaft when the hand wheel is rotated in a sense to draw the end portion of said shaft into the end portion of said inner sleeve and to shift the outer sleeve toward the end portion of said shaft.

6. A pipe aligning tool as set forth in claim 5, further comprising a motion transmitting member disposed between said hand wheel and the second end of said outer sleeve.

7. A pipe aligning tool as set forth in claim 5, wherein one link of each of said second group of clamps is articulately connected with the first end of said outer sleeve.

8. A pipe aligning tool, comprising an outer sleeve having a first and a second end; a single inner sleeve axially movably received in and having an end portion extending beyond the first end of said outer sleeve; a tubular shaft axially movably received in and having an end portion extending beyond the end portion of said inner sleeve, said shaft having internal threads adjacent to the second end of said outer sleeve; a first group of clamps each including a pair articulately connected links having inner ends each pivotably secured to a different one of said end portions; a second group of clamps each including a pair of articulately connected links having inner ends one of which is pivotably secured to one of said end portions and the other of which is movable axially of said inner sleeve when the end portion of said inner sleeve moves toward the second end of said outer sleeve or vice versa, the clamps of each of said groups being spaced angularly about the axis of said shaft and each clamp further comprising a shoe member connected with at least one link of the respective pair of links at a point spaced from the inner end of said one link; and a hand wheel having an externally threaded portion meshing with said shaft, said hand wheel being adjacent to the second end of and being arranged to shift said outer sleeve so that said shoe members are moved radially outwardly of said shaft when the hand wheel is rotated in a sense to draw the end portion of said shaft into the end portion of said inner sleeve and to shift the outer sleeve toward the end portion of said shaft.

9. A pipe aligning tool as set forth in claim 8, further comprising motion transmitting means connecting said hand wheel with said outer sleeve so that said outer sleeve shares axial movements of said hand wheel with reference to said shaft.

10. A pipe aligning tool, comprising an outer sleeve having a first and a second end; a single inner sleeve axially movably received in and having a first and a second end portion respectively extending beyond the first and second end of said outer sleeve; a shaft axially movably received in and having a first and a second end portion respectively extending beyond the first and second end portion of said inner sleeve, said second end portions being provided with external threads; a first group of clamps each including a pair of articulately connected links having inner ends each pivotably secured to a different one of said first end portions; a second group of clamps each including a pair of articulately connected links having inner ends one of which is pivotably secured to one of said first end portions and the other of which is movable axially of said inner sleeve when the first end portion of said inner sleeve moves toward the second end of said outer sleeve or vice versa, the clamps of each of said groups being spaced angularly about the axis of said shaft and each clamp further comprising a shoe member connected with at least one link of the respective pair of links at a point spaced from the inner end of said one link; a first hand wheel having an internally threaded portion meshing with the second end portion of said shaft and adjacent to the second end portion of and arranged to shift said inner sleeve so that the shoe members of said first group of clamps move radially outwardly when said hand wheel is rotated in a sense to draw the first end portion of said shaft into the inner sleeve; and a second hand wheel comprising an internally threaded portion meshing with the second end portion of said inner sleeve and adjacent to the second end of and arranged to shift said outer sleeve so as to move the shoe members of said second group of clamps radially outwardly when said second hand wheel is rotated in a sense to draw the first end portion of said inner sleeve into said outer sleeve.

11. A pipe aligning tool, comprising an outer sleeve; a single inner sleeve axially movably received in and having an end portion extending beyond one end of said outer sleeve; a shaft axially movably received in and having an end portion extending beyond the end portion of said inner sleeve; a first group of clamps each including a pair of crossing links having inner ends each pivotably secured to a different one of said end portions; a second group of clamps each including a pair of crossing links having inner ends one of which is pivotably secured to one of said end portions and the other of which is movable axially of said inner sleeve when the end portion of said inner sleeve moves toward the end of said outer sleeve or vice versa, each of said groups comprising more than two clamps spaced angularly about the axis of said shaft and each clamp further comprising a pivot articulately connecting the respective pairs of links intermediate the inner and outer ends thereof so that the outer ends of said links extend radially outwardly and beyond the respective pivots, each of said clamps further comprising an elongated shoe member having ends articulately connected with the outer ends of the respective pair of links; and actuating means for moving said sleeves and said shaft with reference to each other so as to move said shoe members radially outwardly and away from said shaft when the end portion of said shaft is being drawn into said inner sleeve and when the outer sleeve is moved toward the end portion of said shaft.

12. A pipe aligning tool as set forth in claim 11, wherein one end of each shoe member is provided with an elongated slot and wherein the outer end of one of each pair of links is provided with a pin extending into and movable longitudinally of the respective slot when the shoe members are caused to move radially of said shaft whereby each shoe member remains parallel with the shaft during such radial movement.

13. A pipe aligning tool as set forth in claim 11, wherein a pivot articulately connecting the respective pairs of links so that the outer end of at least one link of each pair of links extends outwardly and beyond the respective pivot, and wherein said shoe member is connected with the outer end of at least said one link of the respective pair of links.

14. A pipe alinging tool as set forth in claim 13, wherein the shoe members of at least one group of clamps are eccentric with reference to and are pivotably connected to the outer ends of the respective links.

15. A pipe aligning tool as set forth in claim 14, wherein each shoe member of said one group of clamps is provided with three uneven surfaces.

16. A pipe aligning tool as set forth in claim 13, wherein the shoe members of at least one group of clamps are articulately connected with the outer ends of the respective links and wherein each shoe member of said one group of clamps is of U-shape having two spaced surface portions which may engage the internal surface of a tubular body.

17. A pipe aligning tool as set forth in claim 1, wherein the clamps of each of said groups comprise more than two equidistant clamps spaced angularly about the axis of said shaft and wherein the clamps of one group are staggered angularly with reference to the clamps of the other group.

18. A pipe aligning tool as set forth in claim 1, wherein one link of each clamp in one of said groups overlapping one link of the other group of clamps.

19. A pipe aligning tool, comprising an outer sleeve; a single inner sleeve member longitudinally movably received in and having a portion extending beyond one end of said outer sleeve; a shaft member longitudinally movably received in and having a portion extending beyond said portion of said inner sleeve member; a first group of clamps each including a pair of articulately connected links having inner ends each pivotably secured to a different one of said portions; a second group of clamps each including a pair of articulately connected links having inner ends one of which is articulately connected to one of said portions and the other of which is movable longitudinally of said inner sleeve member when said portion of said inner sleeve member moves toward said one end of said outer sleeve or vice versa, the clamps of each of said groups being spaced angularly about said shaft member and each clamp further comprising a shoe connected with at least one link of the respective pair of links at a point spaced from the inner end of said one link; and actuating means for moving said outer sleeve, said inner sleeve member and said shaft member longitudinally with reference to each other so that the shoes of said first group of clamps are moved substantially radially of the shaft member in response to relative movement between said portions and that the shoes of said second group of clamps are moved substantially radially of the shaft member in response to relative movement between said outer sleeve and said one portion each of said members including two sections and further comprising a first and a second joint respectively providing an articulated connection between the sections of said shaft member and the sections of said inner sleeve member so that one section of each member may be tilted with reference to the other section of the same member at a point located intermediate said groups of clamps.

20. A pipe aligning tool as set forth in claim 19, wherein said first and said second joint are in the form of a first and a second swivel joint respectively connecting the sections of said shaft member and the sections of said inner sleeve member to each other so that one section of each of said members may swivel with reference to the other sections of the same member at a point located intermediate said first and second groups of clamps.

21. A pipe aligning tool as set forth in claim 20, wherein said first swivel joint includes a flexible element having end portions connected to the sections of said shaft member.

22. A pipe aligning tool as set forth in claim 20, wherein said second swivel joint is a universal joint.

23. A pipe aligning tool as set forth in claim 20, wherein said second swivel joint is a universal joint including a first coupling element secured to one section and a second coupling element articulately secured to the other section of said inner sleeve member, said coupling elements being articulately connected to each other and defining a passage between the internal spaces of the sections of said inner sleeve member, said second swivel joint including an elongated flexible element extending through said passage and having end portions connected with the sections of said shaft member.

24. A pipe aligning tool as set forth in claim 1, wherein said actuating means comprise a fluid-operated cylinder including a housing secured to said outer sleeve and a piston reciprocably received in said housing and connected with said shaft member.

References Cited
UNITED STATES PATENTS 2,615,413 10/1952 Adams et al. _____ 269—34
3,030,903  4/1962 Morris _____ 269—48.1

JOHN F. CAMPBELL, *Primary Examiner.*

THOMAS H. EAGER, *Examiner.*